US010138726B2

(12) United States Patent
Roberson

(10) Patent No.: US 10,138,726 B2
(45) Date of Patent: Nov. 27, 2018

(54) DOWNHOLE COMMUNICATIONS USING SELECTABLE FREQUENCY BANDS

(71) Applicant: Halliburton Energy Services, Inc., Houston, TX (US)

(72) Inventor: Mark W. Roberson, Cary, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/541,853

(22) PCT Filed: Mar. 11, 2015

(86) PCT No.: PCT/US2015/019847
§ 371 (c)(1),
(2) Date: Jul. 6, 2017

(87) PCT Pub. No.: WO2016/144343
PCT Pub. Date: Sep. 15, 2016

(65) Prior Publication Data
US 2018/0003041 A1   Jan. 4, 2018

(51) Int. Cl.
| | |
|---|---|
| *E21B 47/00* | (2012.01) |
| *E21B 47/12* | (2012.01) |
| *E21B 47/06* | (2012.01) |
| *E21B 49/00* | (2006.01) |
| *E21B 49/08* | (2006.01) |
| *H04W 72/04* | (2009.01) |

(52) U.S. Cl.
CPC ........ *E21B 47/122* (2013.01); *E21B 47/0005* (2013.01); *E21B 47/06* (2013.01); *E21B 47/065* (2013.01); *E21B 47/12* (2013.01); *E21B 49/00* (2013.01); *E21B 49/08* (2013.01); *H04W 72/0453* (2013.01); *E21B 2049/085* (2013.01)

(58) Field of Classification Search
CPC ..................................................... E21B 47/122
USPC ....................................................... 340/854.6
See application file for complete search history.

(56) References Cited

U.S. PATENT DOCUMENTS

| | | | |
|---|---|---|---|
| 4,390,975 A | 6/1983 | Shawhan | |
| 5,148,408 A | 9/1992 | Matthews | |
| 2008/0030365 A1* | 2/2008 | Fripp | ..................... E21B 47/16 340/853.1 |
| 2010/0177596 A1 | 7/2010 | Fink et al. | |

(Continued)

FOREIGN PATENT DOCUMENTS

| | | |
|---|---|---|
| WO | 2011019351 | 2/2011 |
| WO | 2014100272 | 6/2014 |

OTHER PUBLICATIONS

International Patent Application No. PCT/US2015/019847, "International Search Report and Written Opinion", dated Oct. 14, 2015, 18 pages.

*Primary Examiner* — Qutbuddin Ghulami
(74) *Attorney, Agent, or Firm* — Kilpatrick Townsend & Stockton LLP

(57) ABSTRACT

A system that is positionable in a wellbore in a subterranean formation can include a first transceiver that is positionable external to a casing string in the wellbore. The first transceiver can wirelessly transmit data via a signal within a frequency band that is selected based on a fluid property of a fluid in the wellbore and a property of the subterranean formation. The system can also include a second transceiver that is positionable externally

20 Claims, 8 Drawing Sheets

(56) References Cited

U.S. PATENT DOCUMENTS

| | | | |
|---|---|---|---|
| 2010/0194586 A1* | 8/2010 | Tjhang | G01V 11/002 340/854.7 |
| 2012/0013893 A1 | 1/2012 | Maida et al. | |
| 2014/0246237 A1 | 9/2014 | Prammer | |

* cited by examiner

DOWNHOLE COMMUNICATIONS USING SELECTABLE FREQUENCY BANDS

CROSS-REFERENCE TO RELATED APPLICATIONS

This is a U.S. national phase under 35 U.S.C. 371 of International Patent Application No. PCT/US2015/019847 titled "Downhole Communications Using Selectable Frequency Bands" and filed Mar. 11, 2015, the entirety of which is incorporated herein by reference.

TECHNICAL FIELD

The present disclosure relates generally to devices for use in well systems. More specifically, but not by way of limitation, this disclosure relates to downhole communications using selectable frequency bands.

BACKGROUND

A well system (e.g., an oil or gas well for extracting fluid or gas from a subterranean formation) can include various sensors. For example, a well system can include sensors for measuring well system parameters, such as temperature, pressure, resistivity, or sound levels. In some examples, the sensors can transmit data via cables to a well operator (e.g., typically at the surface of the well system). Cables can wear or fail, however, due to the harsh downhole environment or impacts with well tools. It can be challenging to communicate data from the sensors to the well surface efficiently.

DETAILED DESCRIPTION

Figure 1:
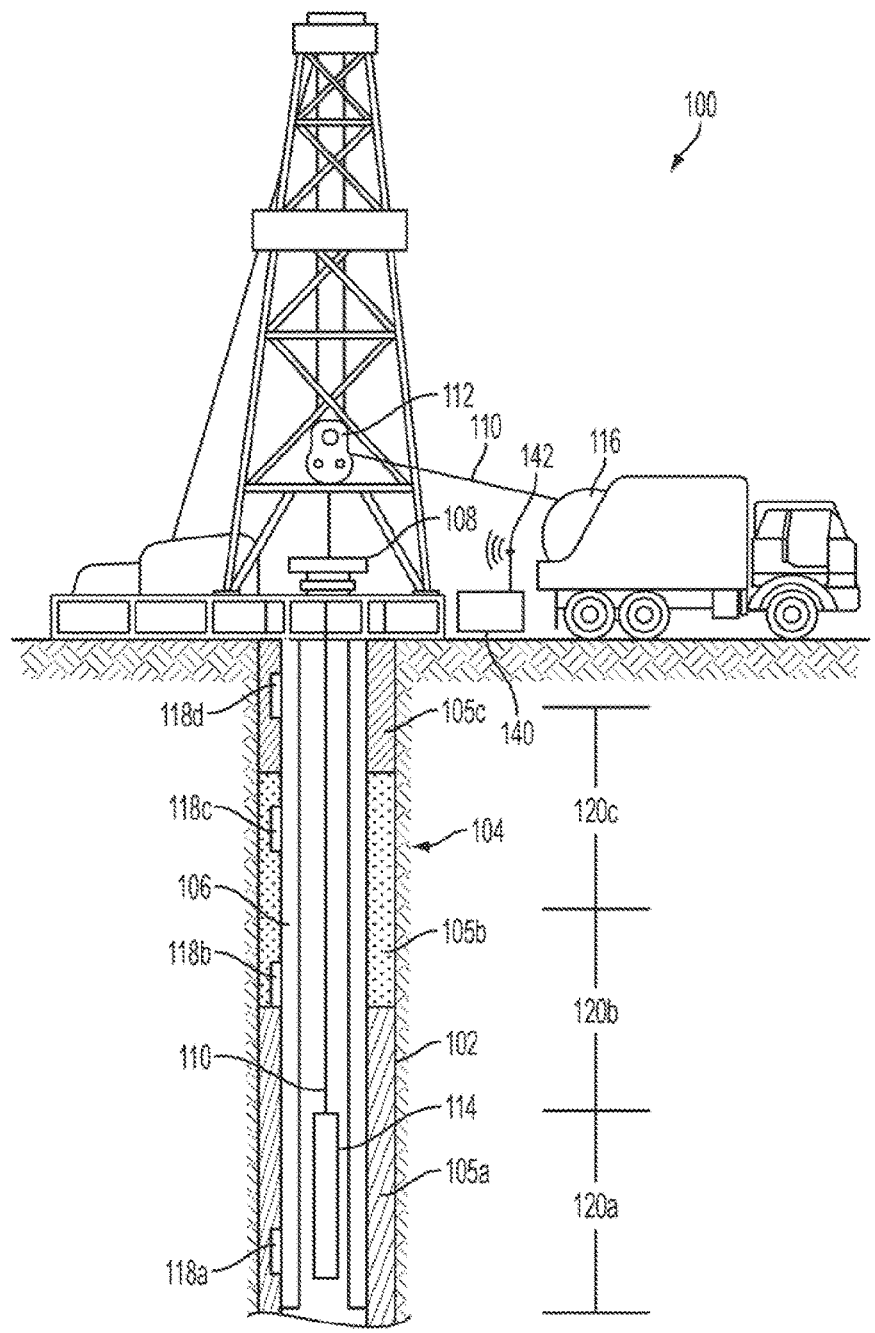
FIG. 1 is a cross-sectional view of an example of a well system that includes a system for downhole communications using selectable frequency bands.

Certain aspects and features of the present disclosure are directed to downhole communications using selectable frequency bands. The downhole communications can be wireless communications between a transceiver positioned external to a casing string in a wellbore and a receiver (e.g., another transceiver or a computing device positioned in the well system). A transceiver can be positioned external to the casing string if it is positioned on or external to an outer diameter or outer wall of the casing string.

The transceiver can transmit data to the receiver using a particular frequency band. The frequency band can include a range of frequencies. For example, a frequency band can include the frequencies between 500 kHz and 1 MHz. In some examples, the frequency band can include a single frequency. For example, the frequency band can be 700 kHz. The transceiver can select the frequency band based on a property of a fluid in the wellbore, a property of a subterranean formation (out of which the wellbore is drilled), a distance between the transceiver and the receiver, a property of the casing string, or any combination of these.

In some examples, the transceiver can include a sensor. For example, the transceiver can include a resistivity sensor for detecting a conductivity of the fluid. As another example, the transceiver can include global positioning system (GPS) unit for detecting a location of the transceiver in the wellbore. As still another example, the sensor can include an electromagnetic sensor for detecting a conductivity of the subterranean formation. The sensor can transmit sensor data to the transceiver. The transceiver can use the sensor data to determine the property of the fluid, the property of the subterranean formation, the distance between the transceiver and the receiver, the property of the casing string, or any combination of these.

In some examples, the transceiver can select a frequency band to improve the distance, wireless transmission efficiency, and data throughput of a wireless transmission. The distance, wireless transmission efficiency, and data throughput of a wireless transmission can depend on the frequency of the wireless transmission. For example, a wireless transmission using a lower frequency, such as 1 kHz, can travel a longer distance with less attenuation than a wireless transmission using a higher frequency, such as 700 kHz. The data throughput for a wireless transmission using a lower frequency, however, can be less than the data throughput for a wireless transmission using a higher frequency. The transceiver can select a frequency band to optimize the distance, wireless transmission efficiency, and data throughput of a wireless transmission.

In some examples, the transceiver can select a particular frequency band to reduce interference between wireless transmissions. For example, multiple pairs of transceivers and receivers can be positioned in the wellbore. Each transceiver can be positioned a short distance (e.g., 10 meters) from a respective receiver. The transceivers can use high frequencies (e.g., 700 kHz) to wirelessly communicate with the receivers. Wireless transmissions using higher frequencies can travel shorter distances and attenuate more than wireless transmissions using lower frequencies. This can allow the wireless transmissions from each transceiver to travel to each respective receiver and then attenuate. The attenuation may reduce interference due to substantially simultaneous wireless transmissions among the pairs of transceivers and receivers.

In some examples, the transceiver can transmit data using two different frequency bands substantially simultaneously. For example, the transceiver can transmit data to the receiver using a wireless signal with a frequency of 50 kHz, which can be in a frequency band between 25 kHz and 75 kHz. The transceiver can substantially simultaneously transmit the data to the receiver using another wireless signal with a frequency of 200 kHz, which can be in a frequency band between 175 kHz and 225 kHz. In some examples, transmitting the same data using two different frequency bands can provide redundancy. For example, the wireless signals can be transmitted through a fluid in the wellbore. The fluid can impact (e.g., attenuate or distort) the wireless signals differently because the wireless signals use different frequency bands. In some examples, if one wireless signal degrades or attenuates before reaching the receiver, the data may be recovered by the receiver via the other wireless signal.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that includes a system for downhole communications using selectable frequency bands. The well system 100 includes a wellbore extending through various earth strata. The wellbore extends through a hydrocarbon bearing subterranean formation 104. In some examples, the subterranean formation 104 can include multiple formation layers 120a-c. Each formation layer 120a-c can include material that is different from or the same as an immediately adjacent formation layer. For example, formation layer 120a can include rock (such as a porous sedimentary rock), formation layer 120b can include a hydrocarbon, and formation layer 120c can include sand or dirt.

A casing string 106 extends from the surface 108 to the subterranean formation 104. The casing string 106 can provide a conduit through which formation fluids, such as production fluids produced from the subterranean formation 104, can travel from the wellbore 102 to the surface 108.

In some examples, fluids 105a-c (e.g., liquids or gases) can be positioned into the wellbore. The fluids 105a-c can include cement. A well operator can pump the fluid 105a into an annulus space between the casing string 106 and a wall of the wellbore. In some examples, the fluid 105a can harden or change physical state (e.g., from a fluid to a solid). For example, if the fluid 105a includes cement, the cement can cure and couple the casing string 106 to the wall of the wellbore.

The well system 100 can also include at least one well tool 114 (e.g., a formation-testing tool). The well tool 114 can be coupled to a wireline 110, slickline, or coiled tubing that can be deployed into the wellbore 102. The wireline 110, slickline, or coiled tubing can be guided into the wellbore 102 using, for example, using a guide 112 or winch. In some examples, the wireline 110, slickline, or coiled tubing can be wound around a reel 116.

The well system 100 can include a computing device 140. The computing device 140 can be positioned at the surface 108, below ground, or offsite. The computing device 140 can include a processor interfaced with other hardware via a bus. A memory, which can include any suitable tangible (and non-transitory) computer-readable medium, such as RAM, ROM, EEPROM, or the like, can embody program components that configure operation of the computing device 140. In some aspects, the computing device 140 can include input/output interface components (e.g., a display, keyboard, touch-sensitive surface, and mouse) and additional storage.

The computing device 140 can include a communication device 142. The communication device 142 can represent one or more of any components that facilitate a network connection. In the example shown in FIG. 1, the communication device 142 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication device 142 can use acoustic waves, mud pulses, surface waves, vibrations, optical waves, or induction (e.g., magnetic induction) for engaging in wireless communications. In other examples, the communication device 142 can be wired and can include interfaces such as Ethernet, USB, IEEE 1394, or a fiber optic interface.

The well system 100 can also include transceivers 118a-d. In some examples, each of the transceivers 118a-d can be positioned on, partially embedded within, or fully embedded within the casing string 106, the cement sheath 105, or both. In some examples, the transceivers 118a-d can be positioned externally to the casing string 106. For example, the transceivers 118a-d can be positioned on an outer housing of the casing string 106, within the cement sheath 105, within the subterranean formation 104, or any combination of these. Positioning the transceivers 118a-d externally to the casing string 106 can be advantageous over positioning the transceivers 118a-d elsewhere in the well system 100, such as within the casing string 106, which can affect a drift diameter of the casing string 106. Additionally, positioning the transceivers 118a-d externally to the casing string 106 can allow the transceivers 118a-d to more accurately and efficiently detect characteristics of the subterranean formation 104, the cement sheath 105, and the casing string 106.

The transceivers 118a-d can wirelessly communicate with one another and the computing device 140. Each of the transceivers 118a-d can include a communications interface (e.g., described in further detail with respect to FIG. 4). The communications interface can be substantially similar to the communication device 142 associated with the computing device 140.

In some examples, the transceivers 118a-d can wirelessly communicate data in segments or "hops" to a destination (e.g., uphole or downhole). For example, a transceiver 118a can transmit data to another transceiver 118b (e.g., positioned farther uphole), which can relay the data to still another transceiver 118c (e.g., positioned even farther uphole), and so on. As another example, one transceiver 118c can transmit data to another transceiver 118d, which can relay the data to a destination (e.g., the computing device 140).

In some examples, each of the transceivers 118a-d can select a frequency band to use to wirelessly communicate. The transceivers 118a-d can select the frequency band based on a property of a fluid 105a-c (e.g., cement, mud, or a hydrocarbon) in the wellbore 102, a property of the subterranean formation 104 (e.g., a formation layer 120a-c), a distance between the transceivers 118a-d, a property of the casing string 106 (e.g., the geometry, position, or material), or any combination of these. For example, the transceiver 118a can determine (e.g., using a sensor) that there is a fluid 105a between transceiver 118a and transceiver 118b that has a low dielectric constant and a low conductivity. The fluid 105a can include an oil-based mud. In some examples, the low dielectric constant and the low conductivity of the fluid 105a can affect the efficiency of wireless communications through the fluid 105a. The transceiver 118a can select a frequency band that improves or optimizes the efficiency of wireless communications through the fluid 105a. For example, the transceiver 118a can select a low frequency band, which may propagate through the fluid 105a with greater efficiency.

As another example, the transceiver 118b can determine that there is a fluid 105b between transceiver 118b and transceiver 118c that has a high dielectric constant and a high conductivity. The fluid 105b can include cement. The high dielectric constant and the high conductivity of the fluid 105b can affect the efficiency of wireless communications through the fluid 105b. The transceiver 118a can select a frequency band that improves or optimizes the efficiency of wireless communications through the fluid 105b. For example, the transceiver 118a can select a high frequency band, which may propagate through the fluid 105b with greater efficiency.

In some examples, at least two of the transceivers 118a-d can use different frequency bands to transmit data. For example, transceiver 118a can transmit data to transceiver 118b using one frequency band and transceiver 118b can transmit data to transceiver 118c using another frequency band. In some examples, the transceivers 118a-c may select different frequency bands based on the different communication mediums (e.g., the different fluids 105a-c, formation layers 120a-c, or both) through which a wireless signal will travel.

Figure 2:
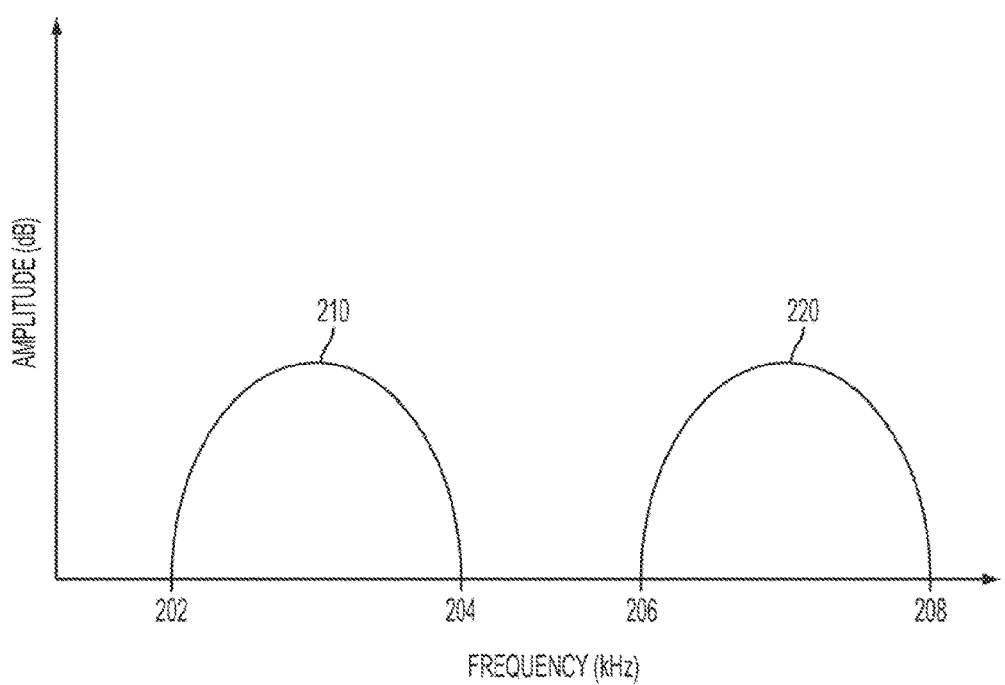
FIG. 2 is a graph depicting an example of frequency bands for downhole communications using selectable frequency bands.

FIG. 2 is a graph depicting an example of frequency bands 210, 220 usable for downhole communications using selectable frequency bands. Each of the frequency bands 210, 220 can include one or more frequencies. In the example shown in FIG. 2, frequency band 210 includes the range of frequencies from frequency 202 to frequency 204. The frequency band 220 includes the range of frequencies from frequency 206 to frequency 208.

As discussed above, a transceiver can select a frequency band 210, 220 to use for wireless communication. The transceiver can select among the frequency bands 210, 220 based on a property of a fluid in a wellbore, a property of a subterranean formation, a distance between two transceivers, a property of the casing string, or any combination of these.

In some examples, a transceiver can wirelessly communicate using at least two frequency bands 210, 220 substantially simultaneously. For example, one transceiver can transmit wireless signals to another transceiver using both frequency bands 210, 220 substantially simultaneously. In some examples, the environment in the wellbore (e.g., a characteristic of a fluid, the casing string, or the subterranean formation) can impact the characteristics of the wireless signals transmitted through the frequency bands 210, 220 differently. For example, the wireless signal transmitted through one frequency band 210 may attenuate or distort more than the wireless signal transmitted through the other frequency band 220. If the wireless signal transmitted through frequency band 210 is unusable or the data is corrupt, the receiving transceiver can retrieve the data from the wireless signal transmitted through frequency band 220. In this manner, transmitting wireless signals through multiple frequency bands 210, 220 substantially simultaneously can provide redundancy.

Figure 3:
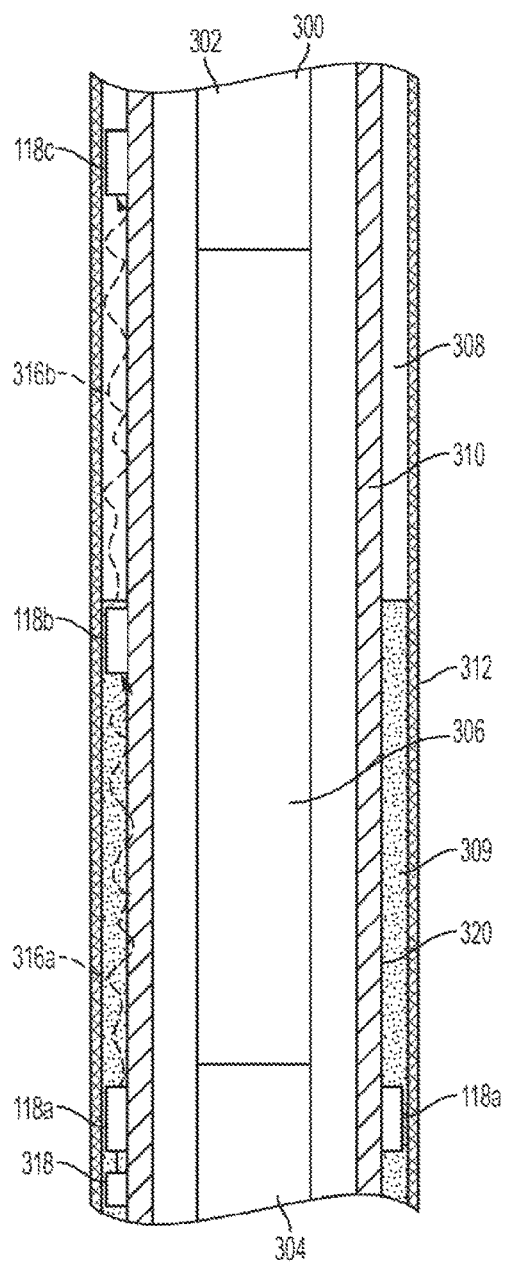
FIG. 3 is a cross-sectional side view of an example of part of a well system that includes a system for downhole communications using selectable frequency bands.

FIG. 3 is a cross-sectional side view of an example of part of a well system that includes a system for downhole communications using selectable frequency bands that includes transceivers 118a-c. The transceivers 118a-c can be positioned on or externally to a casing string 310 in a wellbore. For example, the transceiver 118a can be positioned coaxially around an outer housing 320 of the casing string 310. In some examples, a well tool 300 can be positioned within the casing string 310. The well tool 300 can include multiple subsystems 302, 304, 306.

Fluid 309 (e.g., a liquid or gas) can be positioned in a space 308 between the casing string 310 to the subterranean formation 312. Examples of the fluid 309 can include cement, mud, a spacing fluid, a servicing fluid, a hydrocarbon, a formation fluid, or any combination of these. In one example, a fluid 309 containing cement can be pumped into the space 308 during cementing operations. The fluid 309, however, may not fill the full longitudinal length of the space 308. This can generate an annulus (e.g., space 308) between a portion of the casing string 310 and the subterranean formation 312. Gas or other material can be positioned in the annulus.

In some examples, each transceiver 118a can include or be electrically coupled to a sensor 318. In the example shown in FIG. 3, the transceiver 118a is electrically coupled to the sensor 318 by a wire. Examples of the sensor 318 can include a pressure sensor, an electromagnetic sensor, a temperature sensor, an acoustic sensor, an accelerometer, a depth sensor, a gyroscope, a global positioning system (GPS) unit, a resistivity sensor, a vibration sensor, an ultrasonic transducer, a fluid analyzer or detector, and a RFID reader. In some examples, the sensor 318 can detect the presence of, absence of, or a property of the fluid 309. The sensor 318 can additionally or alternatively detect a property of a portion of the subterranean formation 312 (e.g., a formation layer), a casing string 310, or both. In some examples, the sensor 318 can additionally or alternatively detect a distance between the transceivers 118a-c. For example, a transceiver 118a can use a GPS unit to determine a location of the transceiver 118a. The transceiver 118a can wirelessly communicate the location to another transceiver 118b. The transceiver 118b can use a GPS unit to determine a location of the transceiver 118b. The transceiver 118b can compare the two locations and determine a distance between the transceivers 118a-b.

In some examples, the sensor 318 can transmit sensor signals to a processor (e.g., associated with a transceiver 118a). The sensor signals can be representative of sensor data. The processor can receive the sensor signals and cause the transceiver 118a to communicate the sensor data (e.g., to another transceiver 118b). For example, the processor can transmit signals to an antenna (e.g., a toroid antenna or a solenoid antenna) to generate a wireless signal 316a representative of the sensor data. In some examples, the sensor 318 can additionally or alternatively transmit sensor signals to an electrical circuit. The electrical circuit can include modulators, demodulators, operational amplifiers, integrated circuits, filters, frequency shifters, capacitors, multiplexers, an electrical-to-optical converter, inductors, and other electrical circuit components. The electrical circuit can receive the sensor signal and perform one or more functions (e.g., amplification, frequency shifting, modulation, multiplexing, filtering, conversion of electrical signals to optical pulses, analog-to-digital conversion, or digital-to-analog conversion) to cause the transceiver 118a to generate the wireless signal 316a. For example, the electrical circuit can amplify and frequency shift the sensor signal to a specific frequency within a frequency band, and transmit the amplified and frequency-shifted signal to an antenna. This can cause the antenna to generate a wireless communication at the specific frequency and that is representative of the sensor signals.

Each of the transceivers 118a-c can select a frequency band for wireless communications. In some examples, each of the transceivers 118a-c can select a frequency band based on a property of a fluid 309 in the wellbore, a property of the subterranean formation 312, a distance between transceivers 118a-c, a property of the casing string 310, or any combination of these. Examples of the property of the fluid 309 can include a type, conductivity, dielectric constant, and location of the fluid 309. Examples of the property of the subterranean formation 312 can include a type, dielectric constant, magnetic permittivity, electric permittivity, and conductivity of a portion of the subterranean formation. Examples of the property of the casing string 310 can include a type, location, geometry, conductivity, dielectric constant, magnetic permittivity, and electric permittivity. In some examples, the sensor 318 can detect the property of the fluid 309, the property of the subterranean formation 312, the distance between the transceivers 118a-c, and/or the property of the casings string 310 and transmit associated sensor data to a transceiver 118a. The transceiver 118a can receive the sensor data and select a frequency band based on the sensor data.

In some examples, selecting a frequency band based on a property of the fluid 309, subterranean formation 312, casings string 310, and/or the distance between the transceivers 118a-c can improve the transmission efficiency of wireless communications between transceivers 118a-c. For example, the transceiver 118a can determine (based on sensor data) that a liquid (e.g., fluid 309) is positioned between the transceivers 118a-b based on data from the sensor 318. In some examples, wireless communications using a higher frequency band (e.g., 1 MHz-2 MHz) can become unstable if transmitted through a liquid. For example, the liquid can distort the wireless communication or cause the wireless communication to attenuate. In some examples, upon detecting the liquid positioned between the transceivers 118a-b, the transceiver 118a may select a lower frequency band that has a lower frequency range (e.g., 10 kHz-50 kHz). The transceiver 118a can transmit a wireless signal 316a using the lower frequency band. This may improve the efficiency of wireless communications between the transceivers 118a-b.

As another example, the transceiver 118b can determine that there is a gas (e.g., air) positioned in the space 308 between the transceiver 118b and transceiver 118c. For example, the sensor can include a liquid sensor that can detect the absence of a liquid between the transceivers 118b-c. In some examples, wireless communications using a higher frequency band can have a sufficient wireless communication efficiency when transmitted through a gas. Wireless communications using a higher frequency band can also have a higher data throughput than wireless communications using a lower frequency band. In some examples, the transceiver 118b can select the higher frequency band to achieve a higher data throughput. The transceiver 118b can transmit a wireless signal 316b using the higher frequency band.

In some examples, the subterranean formation 312 can include multiple formation layers (e.g., formation layers 120a-c of FIG. 1). The formation layers can have different properties. For example, the formation layers can include different properties, such as different materials, geometries, conductivities, and dielectric constants. The transceiver 118a can detect, via a sensor 318 (e.g., which can include an impedance sensor), the properties of a formation layer. For example, the sensor 318 can detect that the conductivity of a formation layer adjacent or near to the transceiver 118a is high. For example, a formation layer positioned between transceivers 118a-b can include a highly conductive material, such as iron or copper. The transceiver 118a can select a frequency band based on the high conductivity of the material. In some examples, wireless communications using the selected frequency band can have a higher efficiency than wireless communications using other frequency bands when transmitted through a highly conductive material.

In some examples, the transceiver 118a-c can determine the a property of the fluid 309, the property of the subterranean formation 312, or both based on a wireless communication from another transceiver 118a-c. For example, the transceivers 118a-c can determine a property of the fluid 309 based on changes or differences in amplitudes, frequencies, signal-to-noise ratios, and phases between multiple wireless communications. In one example, air can be positioned between the transceivers 118a-b, causing a wireless communication between the transceivers 118a-b to have a high amplitude. Thereafter, if a liquid (e.g., cement) is positioned between the transceivers 118a-b, a wireless communication between the transceivers 118a-b can have a lower amplitude. For example, if there is a fluid incursion in the wellbore, the wireless communication can have a lower amplitude. The transceiver 118b can detect the decrease in amplitude and determine that the liquid, or another material, is positioned between the transceivers 118a-b. This may alert a well operator to an anomaly in the wellbore. In some examples, the transceivers 118a-b can determine the type, dielectric constant, and conductivity of the fluid 309 based on the decrease in amplitude. For example, the transceivers 118a-b can consult a lookup table in memory to determine a type, conductivity, dielectric constant, or any combination of these for the fluid 309 based on the decrease in amplitude. The transceivers 118a-b can select a frequency band based on the type, conductivity, dielectric constant, and location of the fluid.

In some examples, the transceiver 118a-c can select a frequency band based on the properties of multiple wireless communications from another transceiver 118a-c. For example, the transceivers 118a-c can determine changes in properties, such as amplitudes and signal-to-noise ratios, between multiple wireless communications. The transceivers 118a-b can select a frequency band based on the changes in the properties. For example, the transceivers 118a can wirelessly communicate data to transceiver 118b using two different frequency bands. The transceiver 118b can measure the signal-to-noise ratio of each of the wireless communications. In some examples, the transceivers 118a-b can select, for future wireless communications, the frequency band with the larger signal-to-noise ratio.

Figure 4:
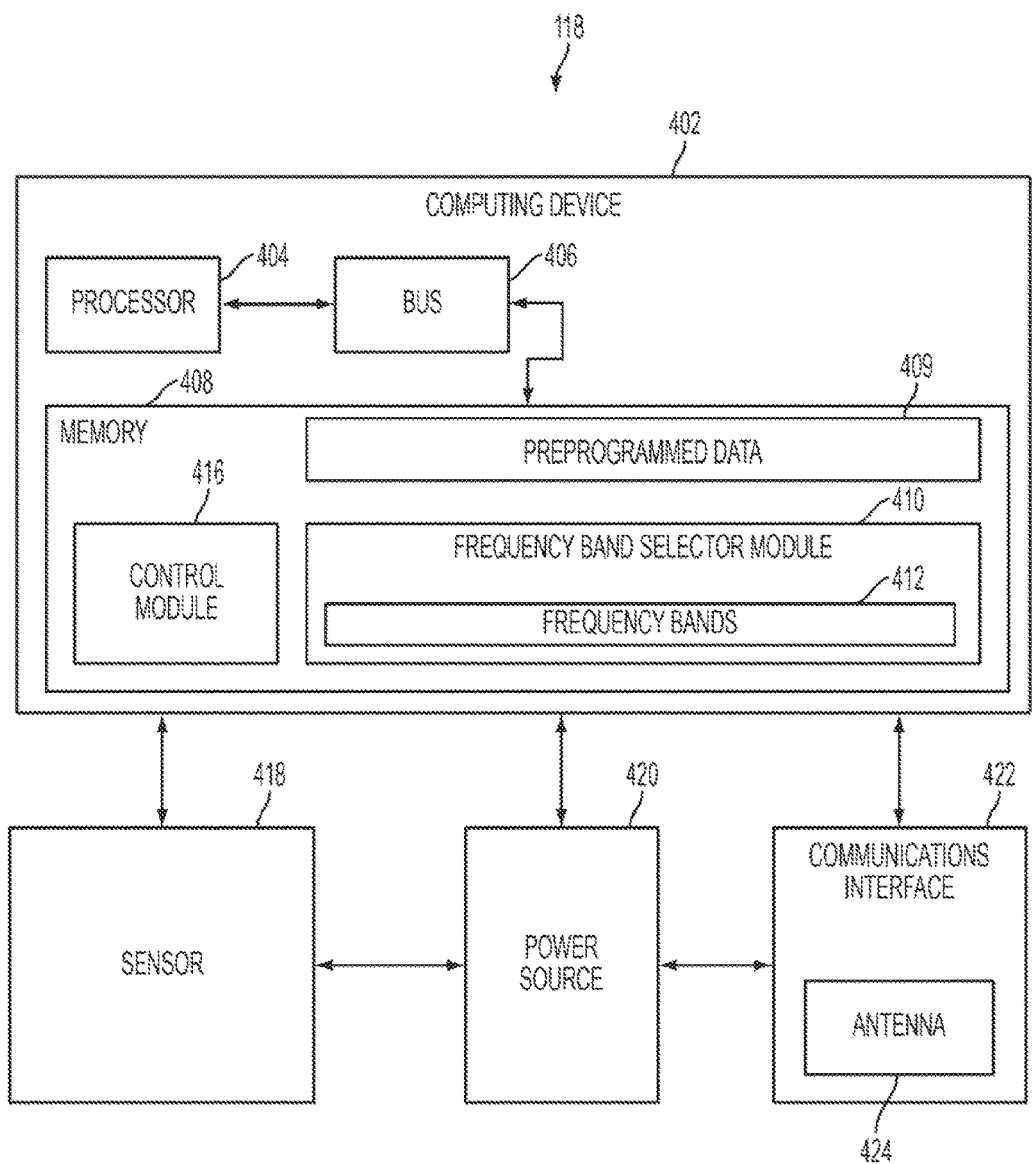
FIG. 4 is a block diagram of an example of a transceiver for implementing downhole communications using selectable frequency bands.

FIG. 4 is a block diagram of an example of a transceiver for implementing downhole communications using selectable frequency bands. In some examples, the components shown in FIG. 4 (e.g., the computing device 402, power source 420, and communications interface 422) can be integrated into a single structure. For example, the components can be within a single housing. In other examples, the components shown in FIG. 4 can be distributed (e.g., in separate housings) and in electrical communication with each other.

The transceiver 118 can include a computing device 402. The computing device 402 can include a processor 404, a memory 408, and a bus 406. The processor 404 can execute one or more operations for operating the transceiver 118. The processor 404 can execute instructions stored in the memory 408 to perform the operations. The processor 404 can include one processing device or multiple processing devices. Non-limiting examples of the processor 404 include a Field-Programmable Gate Array ("FPGA"), an application-specific integrated circuit ("ASIC"), a microprocessor, etc.

The processor 404 can be communicatively coupled to the memory 408 via the bus 406. The non-volatile memory 408 may include any type of memory device that retains stored information when powered off. Non-limiting examples of the memory 408 include electrically erasable and programmable read-only memory ("EEPROM"), flash memory, or any other type of non-volatile memory. In some examples, at least some of the memory 408 can include a medium from which the processor 404 can read instructions. A computer-readable medium can include electronic, optical, magnetic, or other storage devices capable of providing the processor 404 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 408 can include various modules 409, 410, 416 for enabling downhole communication using selectable frequency bands. In some examples, the memory 408 can include a frequency band selector module 410. The frequency band selector module 410 can include instructions for selecting a frequency band to use to transmit data. The frequency band selector module 410 may or may not include instructions for selecting the frequency band from among multiple stored frequency bands 412.

In some examples, the memory 408 can include a control module 416. The control module 416 can include instructions for receiving data from a sensor 418, communications interface 422, or both and operating the frequency band selector module 410 based on the data. For example, the control module 416 can cause the frequency band selector module 410 to select frequency band between 500 kHz and 1 MHz from among the stored frequency bands 412.

In some examples, the control module 416 can include instructions for determining a property of the fluid based on data from a sensor 418. For example, the control module 416 can include a lookup table in which data from the sensor 418 is mapped to fluid properties. The control module 416 can include instructions for consulting the lookup table to determine a fluid property based on the data.

In some examples, the control module 416 can include instructions for determining a property of the subterranean formation based on data from a sensor 418. In some examples, the control module 416 can include a lookup table in which data from the sensor 418 is mapped to subterranean formation properties. The control module 416 can include instructions for consulting the lookup table to determine a subterranean formation property based on the data.

In some examples, the control module 416 can include instructions for determining a property of the casing string based on data from a sensor 418. In some examples, the control module 416 can include a lookup table in which data from the sensor 418 is mapped to casing string properties. The control module 416 can include instructions for consulting the lookup table to determine a casing string property based on the data.

In some examples, the control module 416 can include instructions for retrieving fluid properties, subterranean formation properties, casings string properties, or any combination of these from preprogrammed data 409 stored in memory 408. A user can program the fluid properties, subterranean formation properties, casings string properties, or any combination of these into memory 408 (e.g., prior to the transceiver 118 being positioned in a wellbore). For example, a well operator can take samples of fluid within the wellbore and the subterranean formation surrounding the wellbore prior to positioning the transceiver 118 in a wellbore. The well operator can determine the properties of the fluid, subterranean formation, or both and program the properties in memory 408. In some examples, the well operator can know the properties of the fluid (e.g., a well servicing fluid), casing string, or both. For example, the well operator can determine a property of the fluid or the casing string, such as the geometry of the casings string, from an operations manual or a specification sheet. The well operator can store the properties of the fluid and the casing string in memory 408.

In some examples, the control module 416 can include a lookup table in which fluid properties, subterranean formation properties, casing string properties, or any combination of these are mapped to frequency bands. The control module 416 can include instructions for consulting the lookup table to determine a frequency band based on a fluid property, a subterranean formation property, a casing string property, or any combination of these. The control module 416 can cause frequency band selector module 410 to select the frequency band (e.g., from among stored frequency bands 412).

In some examples, the control module 416 can include instructions for receiving a wireless communication from another transceiver 118. The control module 416 can include instructions for operating the frequency band selector module 410 based a characteristic of the wireless communication. For example, the control module 416 can include instructions for determining, based on the amplitude, frequency, and phase of the wireless communication, a frequency band from among stored frequency band 412, and operating the frequency band selector module 410 to select the frequency band. In some examples, the control module 416 can include a lookup table in which the characteristics of a wireless communication are mapped to frequency bands, fluid properties, subterranean formation properties, casing string properties, or any combination of these. The control module 416 can include instructions for consulting the lookup table to determine a frequency band, a fluid property, a subterranean formation property, casing string property, or any combination of these based on the characteristics of the wireless communication.

In some examples, the control module 416 can include instructions for determining multiple frequency bands to use in wirelessly communicating data. The control module 416 can cause the frequency band selector module 410 to select the multiple frequency bands. For example, the control module 416 can use any of the methods described in the present disclosure to determine the two most efficient frequency bands through which to wirelessly communicate data. The control module 416 can cause the frequency band selector module 410 to select the two frequency bands. In some examples, the transceiver 118 can wirelessly communicate using the two frequency bands substantially simultaneously.

The transceiver 118 can include a power source 420. The power source 420 can be in electrical communication with the computing device 402, the communications interface 422, and the sensor 418. In some examples, the power source 420 can include a battery (e.g. for powering the transceiver 118). In other examples, the transceiver 118 can be coupled to and powered by an electrical cable (e.g., a wireline).

Additionally or alternatively, the power source 420 can include an AC signal generator. The computing device 402 can operate the power source 420 to apply a transmission signal to the antenna 424. For example, the computing device 402 can cause the power source 420 to apply a voltage with a frequency to the antenna 424 to generate a wireless communication. In other examples, the computing device 402, rather than the power source 420, can apply the transmission signal to the antenna 424 to generate the wireless communication.

The transceiver 118 can include a communications interface 422. The communications interface 422 can include or can be coupled to an antenna 424. In some examples, part of the communications interface 422 can be implemented in software. For example, the communications interface 422 can include instructions stored in memory 408.

The communications interface 422 can detect signals from another transceiver 118. In some examples, the communications interface 422 can amplify, filter, demodulate, demultiplex, demodulate, frequency shift, and otherwise manipulate the detected signals. In some examples, the communications interface 422 can receive a signal in a frequency band from one transceiver 118, frequency shift the signal to a new frequency band, and transmit the frequency shifted signal to another transceiver 118. In this manner, the transceiver 118 can receive a signal in one frequency band and relay data to another transceiver 118 using another frequency band, without converting the data to a digital signal (e.g., for use by the processor 404). This may save time and power. In other examples, the communications interface 422 can transmit a signal associated with the detected signals to the processor 404. The processor 404 can receive and analyze the signal to retrieve data associated with the detected signals.

In some examples, the processor 404 can analyze the data from the communications interface 422 and perform one or more functions. For example, the processor 404 can generate a response based on the data. The processor 404 can cause a response signal associated with the response to be transmitted to the communications interface 422. The communications interface 422 can generate a transmission signal (e.g., via the antenna 424) to communicate the response to another transceiver 118. For example, the processor 404 or communications interface 422 can amplify, filter, modulate, frequency shift, multiplex, and otherwise manipulate the response signal to generate the transmission signal. In some examples, the communications interface 422 can encode data within the response signal using a modulation technique (e.g., frequency modulation, amplitude modulation, or phase modulation) to generate the transmission signal. The communications interface 422 can transmit the transmission signal to the antenna 424. The antenna 424 can receive the transmission signal and responsively generate a wireless communication. In this manner, the processor 404 can receive, analyze, and respond to communications from another transceiver 118.

The computing device 402 can include a sensor 418. Examples of the sensor 418 can include a pressure sensor, temperature sensor, microphone, accelerometer, depth sensor, resistivity sensor, electromagnetic sensor, vibration sensor, ultrasonic transducer, GPS unit, fluid analyzer or sensor, RFID tag, and a RFID reader. The sensor 418 can transmit data to the processor 404 (e.g., for analysis, communication to another transceiver 118, or both). In some examples, the sensor 418 includes the communications interface 422 and the data is associated with a received wireless communication.

Figure 5:
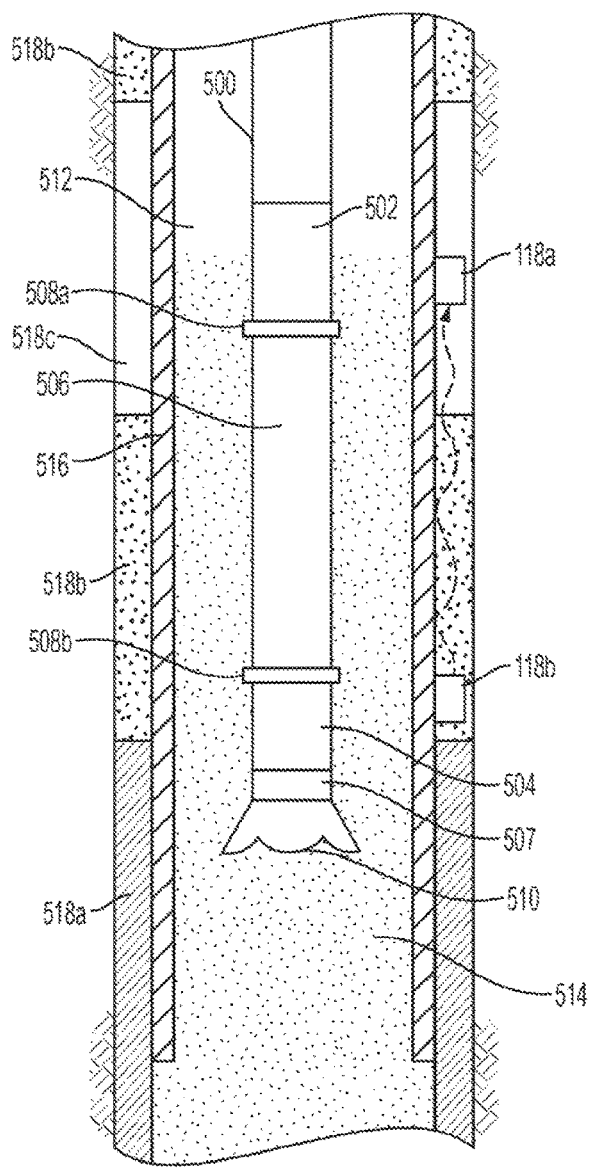
FIG. 5 is a cross-sectional side view of another example of part of a well system that includes a system for downhole communications using selectable frequency bands.

FIG. 5 is a cross-sectional side view of another example of part of a well system that includes a system for downhole communications using selectable frequency bands. In this example, the well system includes a wellbore. The wellbore can include a casing string 516. In some examples, a fluid 514 (e.g., mud) can be positioned in the wellbore (e.g., in annulus 512).

A well tool 500 (e.g., logging-while-drilling tool) can be positioned in the wellbore. The well tool 500 can include various subsystems 502, 504, 506, 507. For example, the well tool 500 can include a subsystem 502 that includes a communication subsystem. The well tool 500 can also include a subsystem 504 that includes a saver subsystem or a rotary steerable system. A tubular section or an intermediate subsystem 506 (e.g., a mud motor or measuring-while-drilling module) can be positioned between the other subsystems 502, 504. In some examples, the well tool 500 can include a drill bit 510 for drilling the wellbore. The drill bit 510 can be coupled to another tubular section or intermediate subsystem 507 (e.g., a measuring-while-drilling module or a rotary steerable system).

The well tool 500 can also include tubular joints 508*a*, 508*b*. Tubular joint 508*a* can prevent a wire from passing between one subsystem 502 and the intermediate subsystem 506. Tubular joint 508*b* can prevent a wire from passing between the other subsystem 504 and the intermediate subsystem 506. The tubular joints 508*a*, 508*b* may make it challenging to communicate data through the well tool 500. It may be desirable to communicate data externally to the well tool 500, for example, using transceivers 118*a-b*.

The transceivers 118*a-b* can be positioned external to the casing string 516. The transceivers 118*a-b* can wirelessly communicate data using a particular frequency band. For example, the transceiver 118*a* can transmit data to transceiver 118*b* using a frequency within a high frequency band (e.g., 1 MHz-2 MHz). In some examples, the wellbore can include multiple different mediums 518*a-c* (e.g., any combination of liquids and gases) through which transceivers 118*a-b* can wirelessly communicate. The transceivers 118*a-b* can select a frequency band based on the characteristics of the mediums 518*a-c*, a characteristic of a subterranean formation out of which the wellbore is drilled, the characteristics of the casing string 516, or any combination of these. This can allow the transceivers 118*a-b* to improve the efficiency and signal-to-noise ratio of wireless communications between the transceivers 118*a-c*.

Figure 6:
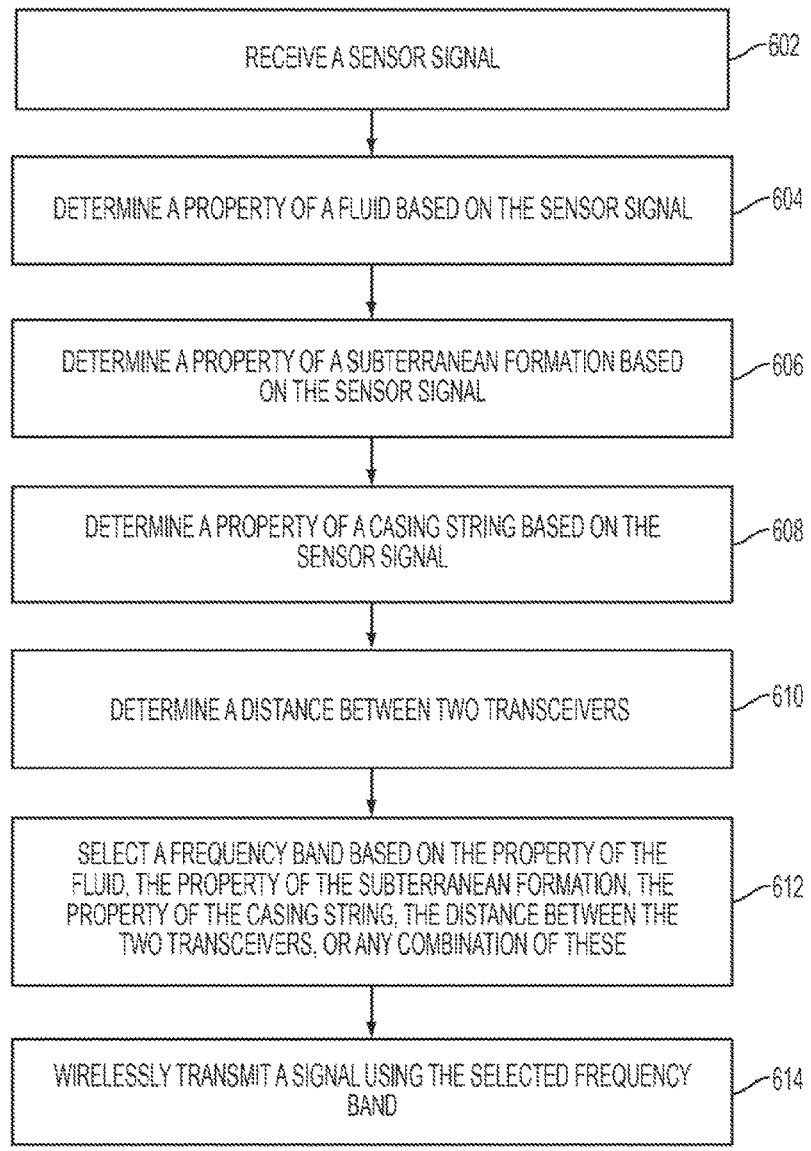
FIG. 6 is a flow chart showing an example of a process for downhole communications using selectable frequency bands.

FIG. 6 is a flow chart showing an example of a process for downhole communications using selectable frequency bands according to one example. Some examples may not include all the steps shown in FIG. 6.

In block 602, a transceiver receives a sensor signal. The sensor signal can be in analog or digital form. A processor within the transceiver can receive the sensor signal from a sensor. The sensor signal can include information associated with a downhole environment. For example, the sensor signal can include or represent a property of fluid in a wellbore, a property of a portion of a subterranean formation, a property of a casing string, or any combination of these.

In block 604, the transceiver determines a property of a fluid based on the sensor signal. For example, as depicted in block 702 of FIG. 7, the transceiver can consult a lookup table stored in memory that maps sensor signal data (or sensor signal characteristics) to fluid properties. The transceiver can use the lookup table to determine the property of the fluid that corresponds to the sensor signal data. For example, the transceiver can use the lookup table to map a positive voltage of the sensor signal to the fluid having a liquid form (e.g., rather than a gaseous form).

In block 606, the transceiver determines a property of a subterranean formation based on the sensor signal. For example, as depicted in block 704 of FIG. 7, the transceiver can consult a lookup table stored in memory that maps sensor signal data (or sensor signal characteristics) to subterranean formation properties. The transceiver can use the lookup table to determine the property of the subterranean formation that corresponds to the sensor signal data. For example, the transceiver can use the lookup table to map a positive voltage of the sensor signal to a high conductivity of the subterranean formation.

In block 608, the transceiver determines a property of a casing string based on the sensor signal. For example, as depicted in block 706 of FIG. 7, the transceiver can consult a lookup table stored in memory that maps sensor signal data (or sensor signal characteristics) to casing string properties. The transceiver can use the lookup table to determine the property of the casing string that corresponds to the sensor signal data. For example, the transceiver can use the lookup table to map a positive voltage of the sensor signal to a high conductivity of the casing string.

In block 610, the transceiver determines a distance between two transceivers. In some examples, the location of at least one of the transceivers is preprogrammed into memory. For example, a well operator can preprogram a position (e.g., GPS coordinates or a distance from the well surface) of both of the transceivers into the memory of the transceiver. The transceiver can retrieve the positions and determine, based on the positions, a distance between the transceivers.

In some examples, the transceiver can determine the distance between two transceivers based on a sensor signal from a sensor. For example, the sensor can include a GPS unit. The transceiver can use the GPS unit to determine a location (e.g., the GPS coordinates) of the transceiver. The transceiver can compare the location to a position of the other transceiver (e.g., programmed into memory or received via a wireless communication from the other transceiver) to determine a distance between the transceivers.

In some examples, the sensor can include a temperature sensor, a pressure sensor, or both. The transceiver can detect a temperature, pressure, or both and use the temperature, pressure, or both to determine the location of the transceiver in the wellbore. For example, different locations in the wellbore may have different temperatures, pressures, or both. The transceiver can consult a lookup table stored in memory (or use an algorithm) to map a temperature, pressure, or both to a particular location in the wellbore. In some examples, the transceiver can receive a wireless communication indicative of a temperature, pressure, or both near another transceiver. The transceiver can use the temperature, pressure, or both near the other transceiver to determine the location of the other transceiver (e.g., via the lookup table or an algorithm). The transceiver can compare its location to the location of the other transceiver to determine a distance between the transceivers.

In some examples, the transceiver can determine a distance between the transceivers based on one or more characteristics (e.g., the type, frequency, duration, waveform, and/or amplitude) of a wireless communication from the other transceiver. For example, the transceiver can receive a wireless communication from the other transceiver and determine the distance to the other transceiver based on transmission medium between the transceivers and/or the amplitude of the wireless communication. As another example, the transceiver can determine a distance between the transceivers based on a timing of wireless communications between the transceivers. For example, the transceiver may transmit a wireless communication to the other transceiver, which may receive the wireless communication and transmit a response back to the transceiver. The transceiver can determine the total time between the initial wireless communication and the response. Based on the total time, the transceiver can determine a distance between the transceivers. For example, the transceiver can divide the total time by two (because the total time can take into account the roundtrip time of the wireless communication) to determine a one-way time. The transceiver can divide the one-way time by the speed of sound to determine the distance between the transceivers.

In block 612, the transceiver selects a frequency band. The transceiver can select the frequency band based on the property of the fluid, the property of the subterranean formation, the property of the casing string, the distance between the two transceivers, or any combination of these. For example, as depicted in block 708 of FIG. 7, the transceiver can consult a lookup table stored in memory that maps fluid properties, subterranean formation properties, casing string properties, or any combination of these to frequency bands. The transceiver can use the lookup table to determine the frequency band that corresponds to the fluid properties, subterranean formation properties, and/or casing string properties. For example, the transceiver can use the lookup table to map a fluid having a liquid form to a low frequency band.

In block 614, the transceiver wirelessly transmits a signal using the frequency band selected in block 612. For example, if the frequency band selected in block 612 is between 15 kHz and 30 kHz, the transceiver can wirelessly transmit a signal using 25 kHz.

Figure 7:
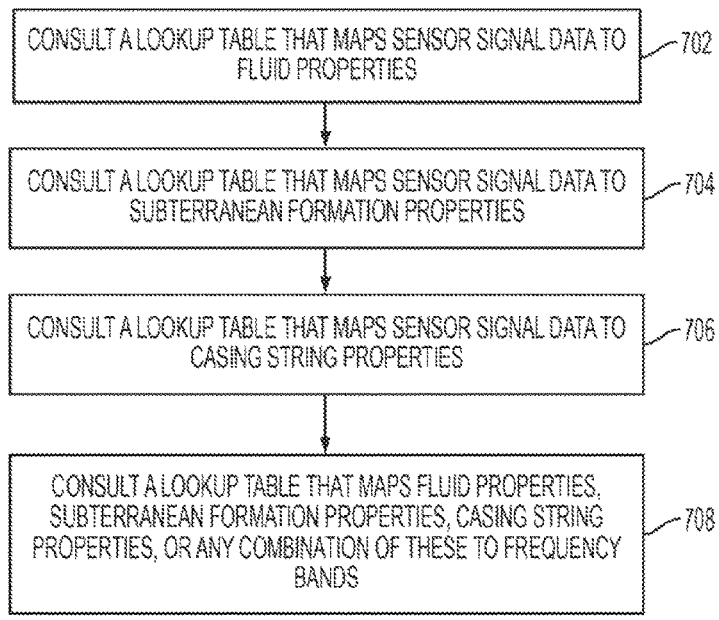
FIG. 7 is a flow chart showing an example of a process for determining a property of a fluid, a property of a subterranean formation, a property of a casing string, and a frequency band according to one example.

FIG. 7 is a flow chart showing an example of a process for determining a property of a fluid, a property of a subterranean formation, a property of a casing string, and a frequency band according to one example. Any of the steps shown in FIG. 7 can be included additionally or alternatively to any of the steps shown in FIG. 6. Some examples may not include all the steps shown in FIG. 7.

In block 702, the transceiver consults a lookup table that maps sensor signal data to fluid properties. For example, the lookup table can be stored in memory and include one column that has sensor signal data (or characteristics) and another column that has fluid properties. The transceiver (e.g., a processor within the transceiver) can determine the fluid property in the same row as the sensor signal data. The lookup table can alternatively be implemented using any of a number of alternative arrangements of sensor signal data and fluid properties.

In block 704, the transceiver consults a lookup table that maps sensor signal data to subterranean formation properties. For example, the lookup table can be stored in memory and include one column that has sensor signal data (or characteristics) and another column that has subterranean formation properties. The transceiver (e.g., a processor within the transceiver) can determine the subterranean formation property in the same row as the sensor signal data. The lookup table can alternatively be implemented using any of a number of alternative arrangements of sensor signal data and subterranean formation properties.

In block 706, the transceiver consults a lookup table that maps sensor signal data to casing string properties. For example, the lookup table can be stored in memory and include one column that has sensor signal data (or characteristics) and another column that has casing string properties. The transceiver (e.g., a processor within the transceiver) can determine the casing string property in the same row as the sensor signal data. The lookup table can alternatively be implemented using any of a number of alternative arrangements of sensor signal data and casing string properties.

In block 708, the transceiver consults a lookup table that maps fluid properties, subterranean formation properties, casing string properties, or any combination of these to frequency bands. For example, the lookup table can be stored in memory and include one column that has fluid properties, another column that has subterranean formation properties, another column that has casing string properties, and still another column that has frequency bands. The transceiver (e.g., a processor within the transceiver) can determine the frequency band in the same row as the fluid property, subterranean formation property, and/or casing string property. The lookup table can alternatively be implemented using any of a number of alternative arrangements of fluid properties, subterranean formation properties, casing string properties, and frequency bands.

Figure 8:
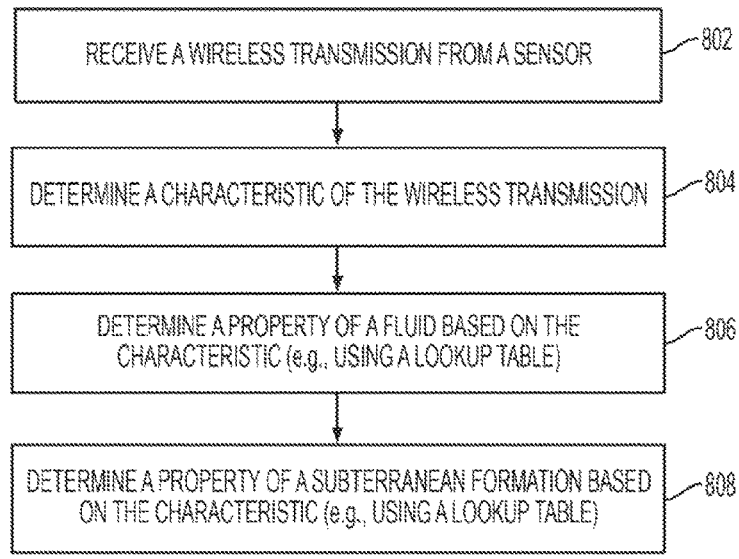
FIG. 8 is a flow chart showing another example of a process for downhole communications using selectable frequency bands.

FIG. 8 is a flow chart showing another example of a process for downhole communications using selectable frequency bands according to one example. Any of the steps shown in FIG. 8 can be included additionally or alternatively to any of the steps shown in FIGS. 6-7. Some examples may not include all the steps shown in FIG. 8.

In block 802, the transceiver receives a wireless transmission from a sensor. In some examples, the sensor includes a communications interface for receiving the wireless transmission.

In block 804, the transceiver determines a characteristic of the wireless transmission. Examples of the characteristic can include an amplitude, phase, frequency, duration, waveform, or any combination of these. In some examples, the transceiver can perform one or more operations to determine the characteristic. For example, the transceiver can perform a Fourier Transform on data associated with the wireless transmission to determine the frequency of the wireless transmission.

In block 806, the transceiver determines a property of a fluid based on the characteristic. For example, the transceiver can consult a lookup table stored in memory that maps wireless communication characteristics to fluid properties. The transceiver can use the lookup table to determine the property of the fluid that corresponds to the characteristic. For example, the transceiver can use the lookup table to map a particular amplitude of the wireless communication to the fluid having a liquid form (e.g., rather than a gaseous form).

In block 808, the transceiver determines a property of a subterranean formation based on the characteristic. For example, the transceiver can consult a lookup table stored in memory that maps wireless communication characteristics to subterranean formation properties. The transceiver can use the lookup table to determine the property of the subterranean formation that corresponds to the characteristic. For example, the transceiver can use the lookup table to map a particular amplitude of the wireless communication to a particular impedance of the subterranean formation.

Figure 9:
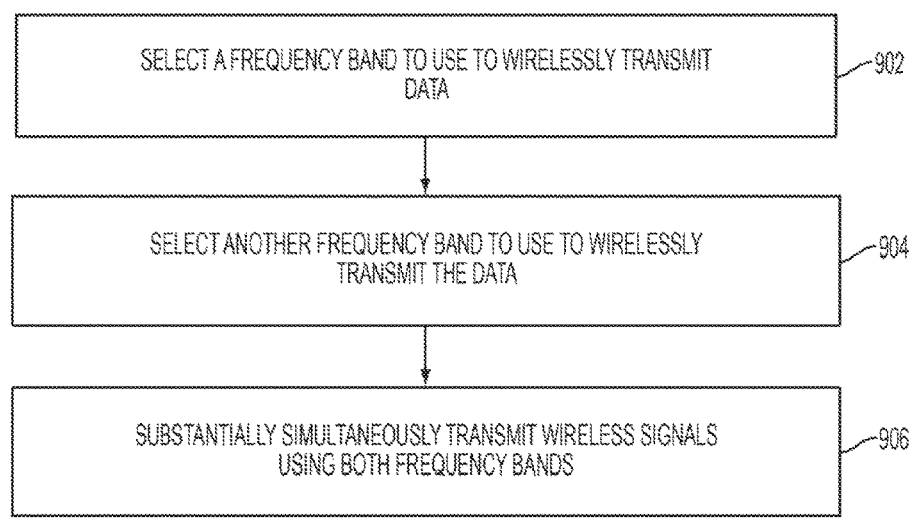
FIG. 9 is a flow chart showing still another example of a process for downhole communications using selectable frequency bands.

FIG. 9 is a flow chart showing still another example of a process for downhole communications using selectable frequency bands. Any of the steps shown in FIG. 9 can be included additionally or alternatively to any of the steps shown in FIGS. 6-8. Some examples may not include all the steps shown in FIG. 9.

In block 902, the transceiver selects a frequency band to use to wirelessly transmit data. The transceiver can select the frequency band using any of the steps described above with respect to FIGS. 6-8.

In block 904, the transceiver selects another frequency band to use to wirelessly transmit data. This frequency band can be different from the frequency band selected in block 902. The transceiver can select the frequency band using any of the steps described above with respect to FIGS. 6-8.

In block 906, the transceiver substantially simultaneously transmits wireless signals (carrying the data) using both of the frequency bands (e.g., the frequency bands selected in blocks 902 and 904). In some examples, the transceiver can substantially simultaneously wirelessly transmit the signals if the transceiver wirelessly transmits the signals within 1 second of each other.

In some aspects, systems and methods for downhole communications using selectable frequency bands are provided according to one or more of the following examples:

EXAMPLE #1

A system that is positionable in a wellbore in a subterranean formation can include a first transceiver that is positionable external to a casing string in the wellbore for wirelessly transmitting data. The first transceiver can wirelessly transmit the data via a signal within a frequency band that is selected based on a fluid property of a fluid in the wellbore and a property of the subterranean formation. The system can also include a second transceiver that is positionable externally the casing string and operable to receive the signal.

EXAMPLE #2

The system of Example #1 may feature the first transceiver being operable to transmit the data via the signal and via another signal within another frequency band substantially simultaneously.

EXAMPLE #3

The system of any of Examples #1-2 may feature the fluid including a combination of a wellbore servicing fluid and a formation fluid.

EXAMPLE #4

The system of any of Examples #1-3 may feature the first transceiver including a processing device and a memory device. The memory device can store instructions executable by the processing device for causing the processing device to: receive a sensor signal from a sensor; determine the fluid property based on the sensor signal; determine the property of the subterranean formation based on the sensor signal; and select the frequency band based on the fluid property and the property of the subterranean formation by consulting a lookup table stored in the memory device. The lookup table can include multiple fluid properties and multiple subterranean formation properties mapped to multiple frequency bands.

EXAMPLE #5

The system of any of Examples #1-4 may feature the first transceiver including a processing device and a memory device. The memory device can store instructions executable by the processing device for causing the processing device to: receive a wireless transmission from a sensor comprising a communications device; detect a signal-to-noise ratio of the wireless transmission; and determine the fluid property and the property of the subterranean formation based on the signal-to-noise ratio by consulting a lookup table stored in the memory device. The lookup table can include multiple fluid properties and multiple formation properties mapped to multiple signal-to-noise ratios.

EXAMPLE #6

The system of any of Examples #1-5 may feature the first transceiver including a memory device that includes preprogrammed fluid properties, subterranean formation properties, and casing string properties. The first transceiver can be operable to retrieve the fluid property, the property of the subterranean formation, and a casing string property from the memory device for selecting the frequency band.

EXAMPLE #7

The system of any of Examples #1-6 may feature the fluid property including a first conductivity of the fluid and the property of the subterranean formation including a second conductivity of the subterranean formation.

EXAMPLE #8

The system of any of Examples #1-7 may feature the first transceiver including a processing device and a memory device. The memory device can store instructions executable by the processing device for causing the processing device to: receive a sensor signal from a sensor; determine a conductivity or a geometry of the casing string based on the sensor signal; and select the frequency band based on the conductivity or the geometry of the casing string by consulting a lookup table stored in the memory device. The lookup table can include multiple casing string properties mapped to multiple frequency bands.

EXAMPLE #9

A communication system that is positionable in a wellbore can include a first transceiver that is positionable external to a casing string in the wellbore for wirelessly transmitting a signal. The signal can be in a frequency band that is selected based on a fluid property of a fluid in the wellbore and a property of a subterranean formation. The communication system can also include a second transceiver that is positionable external to the casing string for receiving the signal, extracting data from the signal, and relaying the data to a third transceiver using another frequency band.

EXAMPLE #10

The communication system of Example #9 may feature the first transceiver being operable to transmit the signal in the frequency band and in a different frequency substantially simultaneously.

EXAMPLE #11

The communication system of any of Examples #9-10 may feature the fluid including a combination of a wellbore servicing fluid and a formation fluid.

EXAMPLE #12

The communication system of any of Examples #9-11 may feature the first transceiver including a processing device and a memory device. The memory device can store instructions executable by the processing device for causing the processing device to: receive a sensor signal from a sensor; determine the fluid property based on the sensor signal; determine the property of the subterranean formation based on the sensor signal; and select the frequency band based on the fluid property and the property of the subterranean formation by consulting a lookup table stored in the memory device. The lookup table can include multiple fluid properties and multiple subterranean formation properties mapped to multiple frequency bands.

EXAMPLE #13

The communication system of any of Examples #9-12 may feature the first transceiver including a processing device and a memory device. The memory device can store instructions executable by the processing device for causing the processing device to: receive a wireless transmission from a sensor comprising a communications device; detect a signal-to-noise ratio of the wireless transmission; and determine the fluid property and the property of the subterranean formation based on the signal-to-noise ratio by consulting a lookup table stored in the memory device. the lookup table can include multiple fluid properties and multiple formation properties mapped to multiple signal-to-noise ratios.

EXAMPLE #14

The communication system of any of Examples #9-13 may feature the first transceiver including a memory device that includes preprogrammed fluid properties, subterranean formation properties, and casing string properties, and wherein the first transceiver is operable to retrieve the fluid property, the property of the subterranean formation, and a casing string property from the memory device for selecting the frequency band.

EXAMPLE #15

The communication system of any of Examples #9-14 may feature the fluid property including a first conductivity of the fluid and the property of the subterranean formation including a second conductivity of the subterranean formation.

EXAMPLE #16

The communication system of any of Examples #9-15 may feature the first transceiver including a processing device and a memory device. The memory device can store instructions executable by the processing device for causing the processing device to: receive a sensor signal from a sensor; determine a conductivity or a geometry of the casing string based on the sensor signal; and select the frequency band based on the conductivity or the geometry of the casing string by consulting a lookup table stored in the memory device. The lookup table can include multiple casing string properties mapped to multiple frequency bands.

EXAMPLE #17

A method can include receiving, by a transceiver that is external to a casing string, a sensor signal from a sensor operable to detect a fluid property of a fluid in a wellbore and a property of a subterranean formation. The method can also include determining the fluid property of the fluid based on the sensor signal; and determining the property of the subterranean formation based on the sensor signal. The method can further include selecting a frequency band based on the fluid property and the property of the subterranean formation. The method can also include wirelessly transmitting data via a signal within the frequency band.

EXAMPLE #18

The method of Example #17 may feature selecting a different frequency band; and wirelessly transmitting the data via another signal within the different frequency band substantially simultaneously to wirelessly transmitting the data via the signal in the frequency band.

EXAMPLE #19

The method of any of Examples #17-18 may feature receiving a wireless transmission from the sensor, the sensor comprising a communications device. The method may also feature detecting a signal-to-noise ratio of the wireless transmission. The method may further feature determining the fluid property and the property of the subterranean formation based on the signal-to-noise ratio by consulting a lookup table. The lookup table can include multiple signal-to-noise ratios mapped to multiple fluid properties and multiple subterranean formation properties.

EXAMPLE #20

The method of any of Examples #17-19 may feature determining a conductivity or a geometry of the casing string based on the sensor signal. The method may also feature selecting the frequency band based on the conductivity or the geometry of the casing string by consulting a lookup table. The lookup table can include multiple casing string properties mapped to multiple frequency bands.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system that is usable to improve wireless communications transmitted through a wellbore in a subterranean formation, the system comprising:
a first transceiver that is positionable external to a casing string in the wellbore for wirelessly transmitting data via a signal within a frequency band, wherein the first transceiver comprises:
a processing device; and
a memory device that includes instructions executable by the processing device for causing the processing device to:
receive one or more sensor signals from one or more sensors;
determine a fluid property of a fluid in the wellbore based on the one or more sensor signals;
determine a property of a subterranean formation based on the one or more sensor signals;
select the frequency band based on the fluid property and the property of the subterranean formation by consulting a lookup table in which a plurality of fluid properties and a plurality of subterranean formation properties are mapped to a plurality of frequency bands; and
a second transceiver that is positionable externally the casing string and operable to receive the signal.

2. The system of claim 1, wherein the first transceiver is operable to transmit the data via the signal and via another signal within another frequency band substantially simultaneously.

3. The system of claim 1, wherein the fluid comprises a combination of a wellbore servicing fluid and a formation fluid.

4. The system of claim 1, wherein the lookup table includes a first lookup table, and wherein the memory device further includes instructions that are executable by the processing device for causing the processing device to:
receive a wireless transmission via a communications device;
detect a signal-to-noise ratio of the wireless transmission; and
determine the fluid property and the property of the subterranean formation based on the signal-to-noise ratio by consulting a second lookup table stored in the memory device in which the plurality of fluid properties and the plurality of subterranean formation properties are mapped to a plurality of signal-to-noise ratios.

5. The system of claim 1, wherein the lookup table further comprises a plurality of casing string properties mapped to the plurality of frequency bands, and wherein the first transceiver is operable to select the frequency band based on a casing-string property.

6. The system of claim 5, wherein the memory device further comprises instructions that are executable by the processing device for causing the processing device to:
determine the casing-string property based on the one or more sensor signals, the casing-string property comprising a conductivity or a geometry of the casing string; and
select the frequency band based on the casing-string property by consulting the lookup table.

7. The system of claim 1, wherein the fluid property comprises a first conductivity of the fluid and the property of the subterranean formation comprises a second conductivity of the subterranean formation.

8. The system of claim 1, wherein the frequency band is selected by the first transceiver in order to increase a transmission distance associated with the signal, increase a transmission efficiency associated with the signal, increase a data throughput associated with the signal, reduce interference between the signal and another wireless signal, or increase a signal-to-noise ratio associated with the signal.

9. A communication system that is positionable in a wellbore, the communication system comprising:
a first transceiver that is positionable external to a casing string in the wellbore for wirelessly transmitting a signal in a frequency band, wherein the first transceiver comprises:
a processing device; and
a memory device that includes instructions executable by the processing device for causing the processing device to:
receive one or more sensor signals from one or more sensors;
determine a fluid property of a fluid in the wellbore based on the one or more sensor signals;

determine a property of a subterranean formation based on the one or more sensor signals;

select the frequency band based on the fluid property and the property of the subterranean formation by consulting a lookup table in which a plurality of fluid properties and a plurality of subterranean formation properties are mapped to a plurality of frequency bands; and a second transceiver that is positionable external to the casing string for receiving the signal, extracting data from the signal, and relaying the data to a third transceiver using another frequency band.

10. The communication system of claim 9, wherein the first transceiver is operable to transmit the signal in the frequency band and in a different frequency substantially simultaneously.

11. The communication system of claim 9, wherein the fluid comprises a combination of a wellbore servicing fluid and a formation fluid.

12. The communication system of claim 9, wherein the lookup table includes a first lookup table, and wherein the memory device further includes instructions that are executable by the processing device for causing the processing device to:

receive a wireless transmission via a communications device;

detect a signal-to-noise ratio of the wireless transmission; and determine the fluid property and the property of the subterranean formation based on the signal-to-noise ratio by consulting a second lookup table stored in the memory device in which the plurality of fluid properties and the plurality of subterranean formation properties are mapped to a plurality of signal-to-noise ratios.

13. The communication system of claim 9, wherein the lookup table further comprises a plurality of casing string properties mapped to the plurality of frequency bands, and wherein the first transceiver is operable to select the frequency band based on a casing-string property.

14. The communication system of claim 13 wherein the memory device further comprises instructions that are executable by the processing device for causing the processing device to:

determine the casing-string property based on the one or more sensor signals, the casing-string property comprising a conductivity or a geometry of the casing string; and select the frequency band based on the casing-string property by consulting the lookup table.

15. The communication system of claim 9, wherein the fluid property comprises a first conductivity of the fluid and the property of the subterranean formation comprises a second conductivity of the subterranean formation.

16. A method usable to improve wireless communications in a wellbore, the method comprising:

receiving, by a first transceiver that is external to a casing string, one or more sensor signals from one or more sensors operable to detect a fluid property of a fluid in the wellbore and a property of a subterranean formation;

determining, by the first transceiver, the fluid property of the fluid based on the one or more sensor signals;

determining, by the first transceiver, the property of the subterranean formation based on the one or more sensor signals;

selecting, by the first transceiver, a frequency band based on the fluid property and the property of the subterranean formation by consulting a lookup table in which a plurality of fluid properties and a plurality of subterranean formation properties are mapped to a plurality of frequency bands; and wirelessly transmitting, by the first transceiver, data via a signal within the frequency band to a second transceiver.

17. The method of claim 16, wherein the frequency band is a first frequency band, and further comprising:

transmitting, by the first transceiver, the signal in both the first frequency band and a second frequency band substantially simultaneously.

18. The method of claim 16, wherein the lookup table comprises a first lookup table, and further comprising:

receiving a wireless transmission, via a communications device;

detecting a signal-to-noise ratio of the wireless transmission; and determining the fluid property and the property of the subterranean formation based on the signal-to-noise ratio by consulting a second lookup table in which a plurality of signal-to-noise ratios are mapped to the plurality of fluid properties and the plurality of subterranean formation properties.

19. The method of claim 16, further comprising:

determining a conductivity or a geometry of the casing string based on a sensor signal; and selecting the frequency band based on the conductivity or the geometry of the casing string by consulting the lookup table, wherein the lookup table further comprises a plurality of casing string properties mapped to the plurality of frequency bands.

20. The method of claim 16, wherein the frequency band is selected by the first transceiver in order to increase a transmission distance associated with the signal, increase a transmission efficiency associated with the signal, increase a data throughput associated with the signal, reduce interference between the signal and another wireless signal, or increase a signal-to-noise ratio associated with the signal.

* * * * *